May 15, 1934. W. PONNDORF 1,959,304
DRYING PLANT FOR MOIST SUBSTANCES
Filed April 12, 1932

Inventor:
W. Ponndorf
by
Hans Hederich
Attorney

Patented May 15, 1934

1,959,304

UNITED STATES PATENT OFFICE 1,959,304

DRYING PLANT FOR MOIST SUBSTANCES

Wilhelm Ponndorf, Cassel-Bettenhausen, Germany, assignor to Friedrich von Baumbach, Siebertshausen, Treysa-Land, Cassel, Germany Application April 12, 1932, Serial No. 604,712
In Germany December 3, 1931

2 Claims. (Cl. 34—44)

With trough-shaped drying apparatus for exhausted wet malt and similar substances the respective substance to be dried is received in a receptacle from which it is conveyed and supplied automatically to the drying drum proper by means of conveying worms or the like. Said receptacles are very bulky, in consequence whereof the complete plant requires correspondingly much space. In order to be able to do with a smaller space resource has already been taken to a common base frame for the said receptacle, the drying apparatus proper, and the drying means for the conveying worm or its equivalent. Although such an arrangement and combination of the parts concerned constitutes an improvement of the previous state, still, it is not an actually satisfying solution of the problem, especially if a moist or wet substance, such as exhausted malt or the like is to be dealt with.

The present invention relates to an improved drying plant in which the receptacle to be dealt with and the drying apparatus are arranged side by side in horizontal position, the length of the drying apparatus being so chosen that it does not surpass the length of the said receptacle, and these members, as well as the drying means for the supply or feed means, being located on a common base frame. Where the receptacle and the drying drum join one another, they have a common wall which extends upwardly beyond the receptacle and the projecting portion of which is so shaped and bent as to form a cover for the drying drum. A further particular feature is this that the heating elements requisite for the proper operation of the plant are so designed and arranged below the other members that they constitute the common base for all said members.

Besides the saving of space, another important advantage presented by that new arrangement and combination of the parts constituting the plant is this that a big part of the heat taken up by the common wall mentioned is transmitted to the moist or wet material present in the receptacle whereby a correspondingly large amount of steam is saved. Owing to the provision of said common wall, a corresponding amount of material for making the plant is saved, the more, as also the two frontal walls of the combined receptacle and drying apparatus at each end thereof are made integral, whereby likewise material, also labor, are saved.

Figure 1:
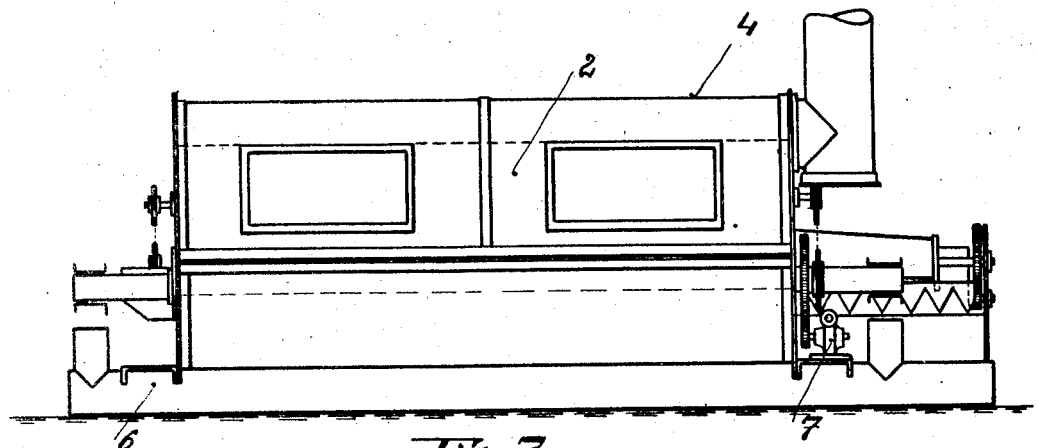
Figure 2:
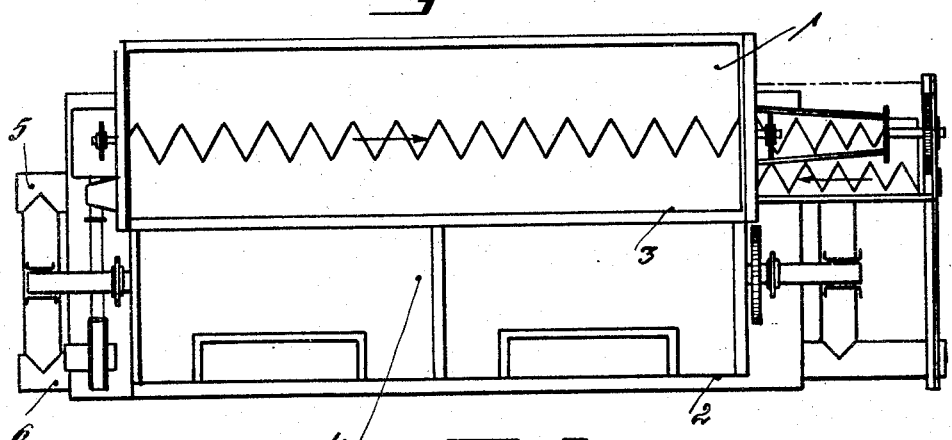
Figure 3:
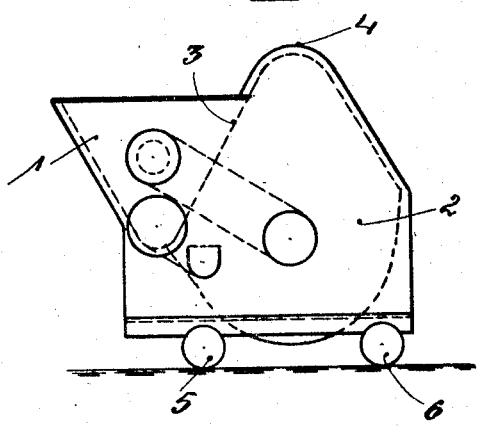

The invention is illustrated diagrammatically and by way of example on the accompanying drawing on which Figure 1 is a side-view of the improved plant. Figure 2 is a plan thereof, and Figure 3 is a front-view of the same.

On the drawing, 1 denotes the receptacle for the wet or moist substance to be dried, and 2 is the drying apparatus proper. The two devices are arranged side by side, as shown, and they have practically the same length; at any rate, the drying device 2 is not longer than the receptacle 1. 3 denotes the common wall of the members 1 and 2 of the plant, and 4 is the extension thereof, which is so shaped and curved that it constitutes also the cover or hood of the drying apparatus. 5 and 6 are the heating elements which are located below the members 1 and 2, and are so designed that they constitute the common base for the said other members, inclusive the motor 7 and the power-transmitting means. A separate base frame, as hitherto requisite, is now no more necessary, or can be, and is, dispensed with, whereby the weight of the complete plant is reduced and its portableness improved. As the base frame formerly requisite is obviated, there is also from this reason much building material saved and the price-cost and erection costs are considerably reduced.

I claim:

1. A drying apparatus for moist or wet substances, comprising, in combination, horizontal heating elements located below the bottom of the apparatus and constituting the supports thereof; a horizontal drying device located upon said heating elements; a horizontal receptacle for the material to be dried, said receptacle being attached to one of the longitudinal sides of said drying device between said heating elements and the top of said drying device and having on that side a common wall with the same, this common wall extending from the top to the bottom of said receptacle.

2. A drying apparatus for moist or wet substances, comprising, in combination, horizontal heating elements located below the bottom of the apparatus and constituting the supports thereof; a horizontal drying device located upon said heating elements; a horizontal receptacle for the material to be dried, said receptacle being attached to one of the longitudinal sides of said drying device between said heating elements and the top of said drying device and having on that side a common wall with the same, this common wall extending from the bottom of said receptacle to the top thereof and further upwardly so as to form also the top of the said drying device.

WILHELM PONNDORF.